United States Patent Office 3,328,898
Patented July 4, 1967

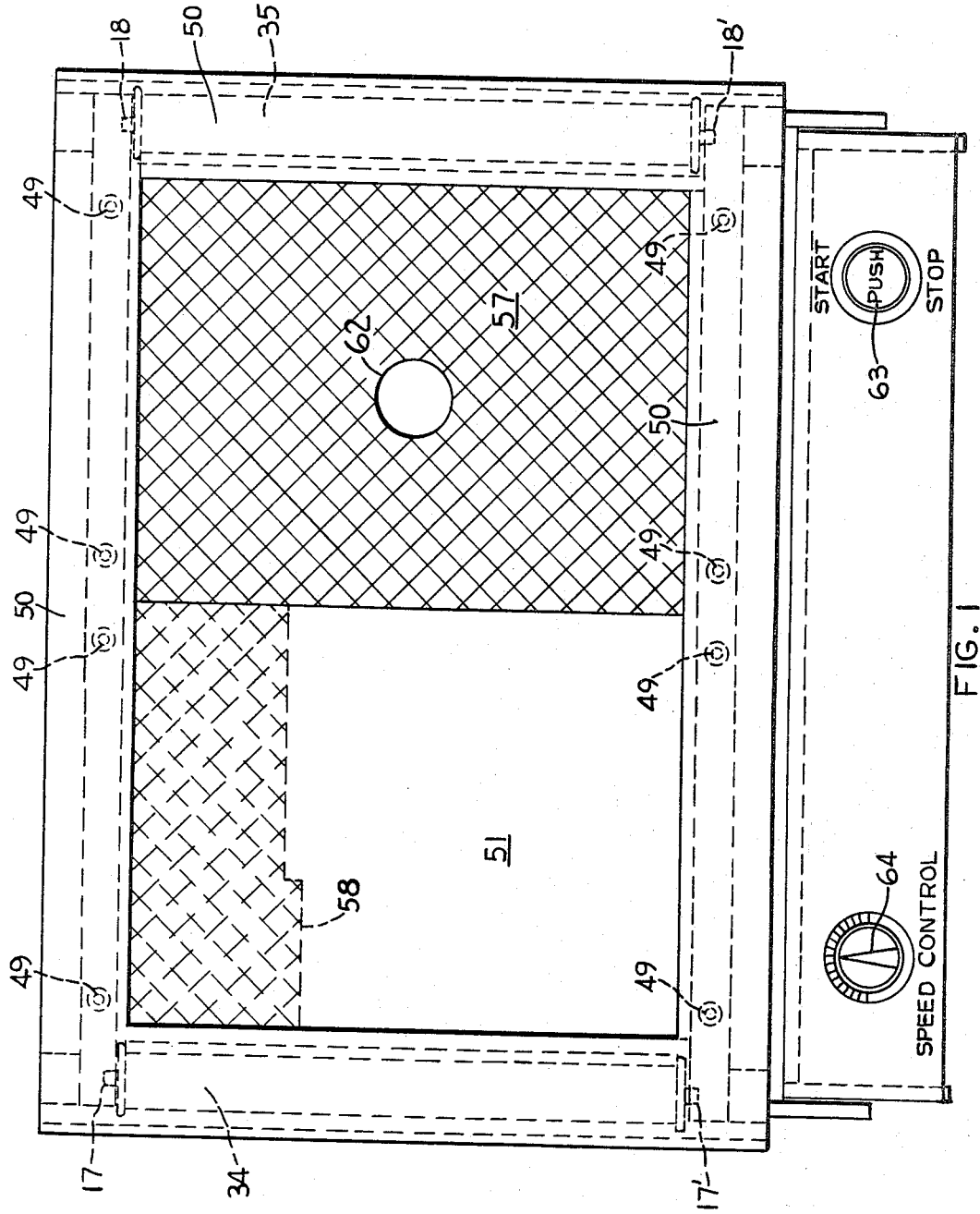

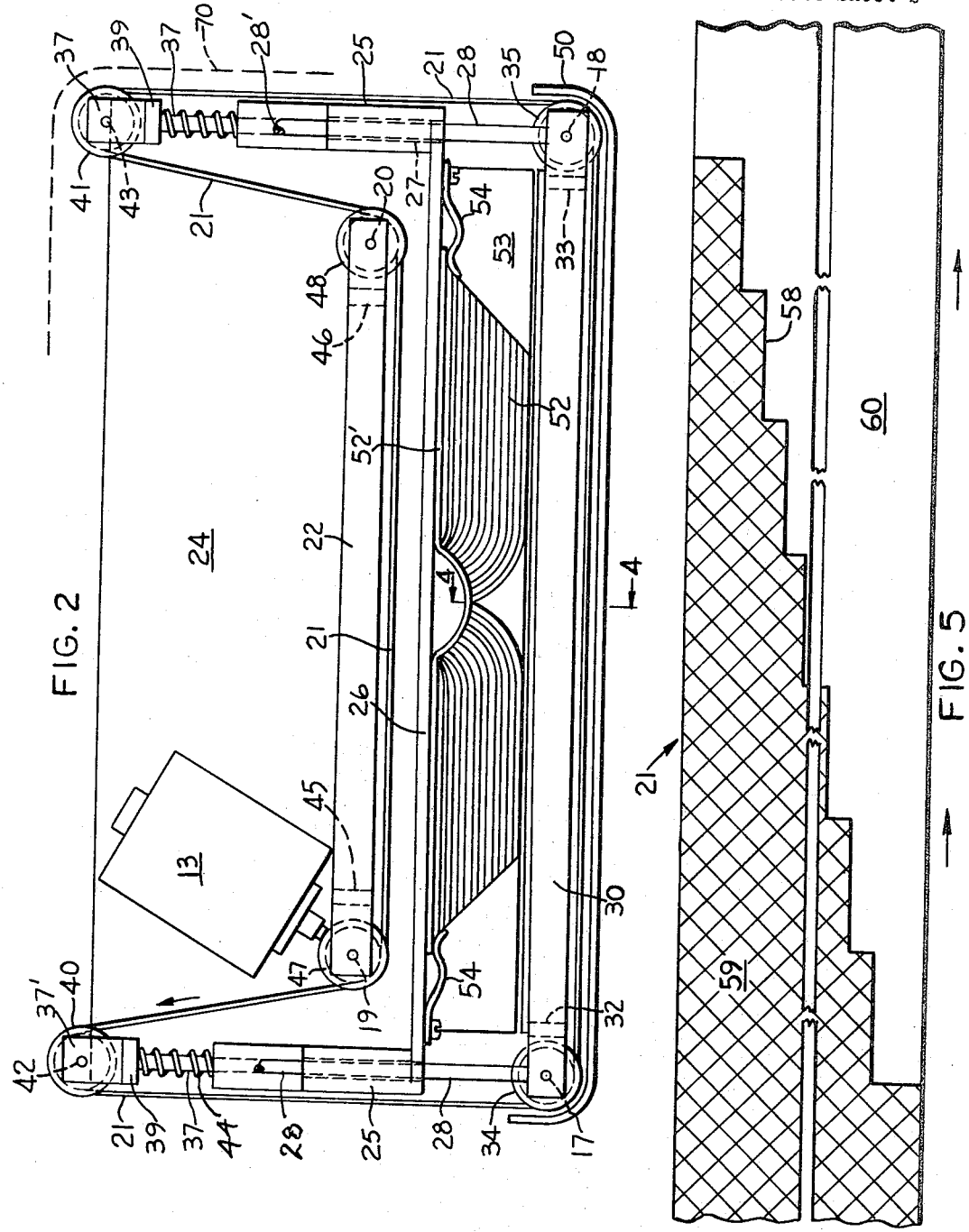

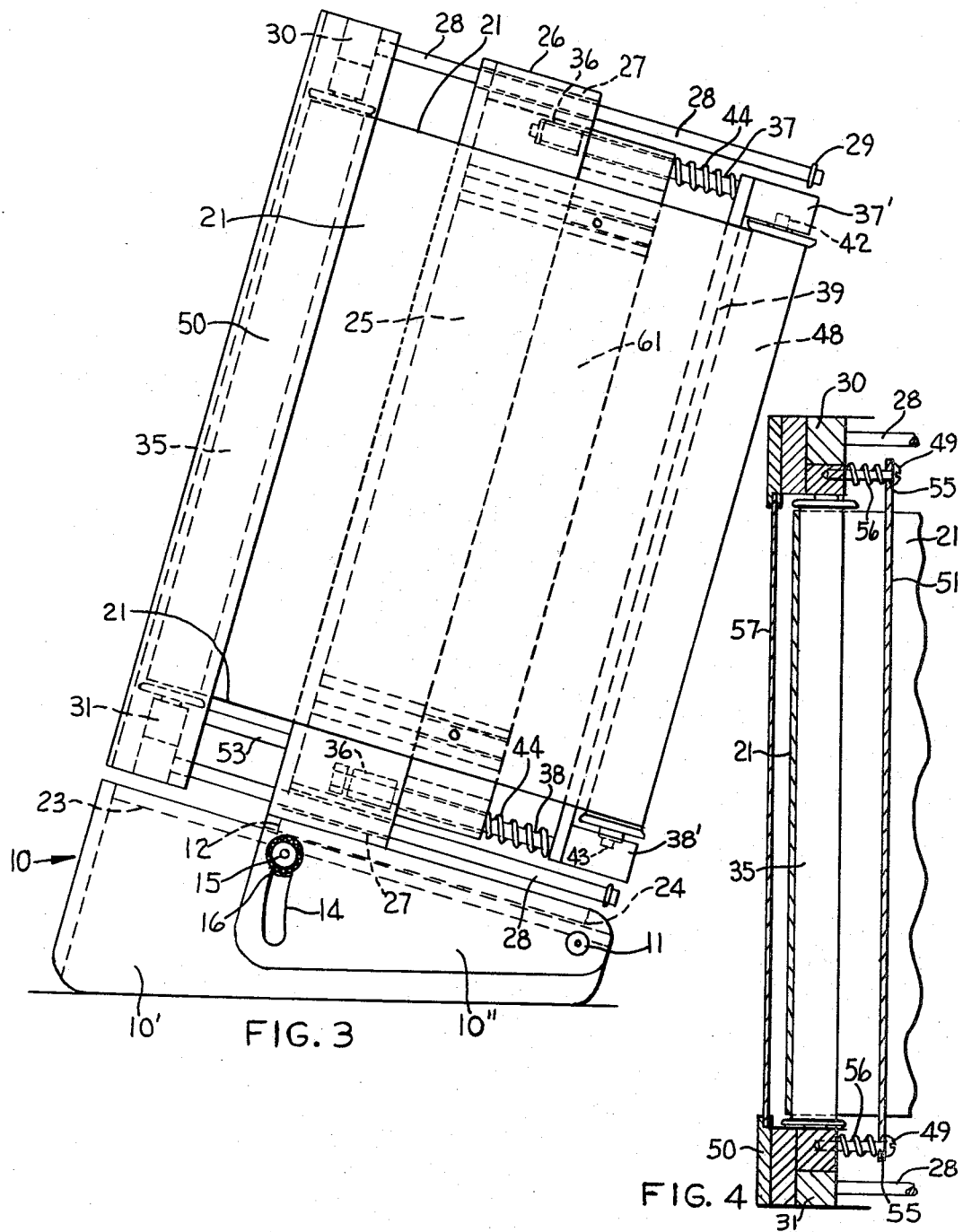

3,328,898
DIRECTIONAL ATTACK READING MACHINE
Joseph W. Raba, 30 Peachtree Lane,
Huntington Station, N.Y. 11746
Filed Oct. 13, 1965, Ser. No. 495,581
6 Claims. (Cl. 35—35)

This invention relates to a machine to measure and to improve the reading speed of a person. More specifically, it deals with a machine in which may be inserted a book, or other reading material, and having a transparent cover plate to hold flat the reading surface. Said machine also has an indirectly spring-loaded book cover for accommodating for the thickness of the reading material, a moving belt strip to expose the lines read, an opaque page cover plate to cover the book page not being read, and other features as will become apparent from the subsequent description.

The present invention is directed to controlled reading involving left-to-right presentation of reading material at predetermined rates and providing a way of directly training functional visual skills and directional attack. The uncovering of the reading material at a timed rate measures and improves the ability to perceive correctly, remember well, and to understand and interpret rapidly and in an organized manner.

Reading machines have been proposed in the prior art, and some are now being used in schools and institutions. Those now in use involve either a reading accelerator using a shield moving from the top of the page to the bottom, or they project the reading matter upon a screen by an optical device. Both of these devices have serious drawbacks or limitations. For example, reading accelerators fail to consider the problem of reading from left to right, or the manner in which all books are written. They are further limited in that they are not applicable to the initial learning of how to read. Projective devices are expensive and limited to reading only that which has previously been selected and photographed. They have a disadvantage of the unnatural reading from a screen, rather then a book. Projective devices create problems of scheduling the equipment and frequently disrupt the classroom procedures. The present invention is relatively inexpensive and is adapted to individual use. Furthermore, it requires no preparation, as in the case of projected slides, for it merely involves insertion of the reading matter, and setting the speed of the moving reading strip.

The invention will be more readily understood by reference to the accompanying drawings in which a preferred embodiment is described, and in which FIGURE 1 presents a front elevational view of a preferred embodiment, with rear ends of upper slide rods cut off, while FIGURE 2 illustrates a top or plan view thereof, with a book inserted for reading. FIGURE 3 depicts a side elevational view thereof, without the inserted book, and FIGURE 4 presents a cross-sectional view, along the plane of line 4—4, of the front portion of FIGURE 2, without the inserted book. FIGURE 5 shows a front elevational view of the endless cover strip, in cut and extended condition, with its center portion cut away. The same numerals refer to similar parts in the various figures.

Referring again to the drawings, numeral 10 designates generally the base having a lower section 10′ which is provided with a top or platform 23. Upper base section 10″ is pivoted onto the rear portion of section 10′ at 11 so as to enable it to move vertically. It also has a top platform 24 onto which is attached the main housing 25 of the machine. Upper base section 10″ also has, on its side or sides, an arcuate slot 14. Screw 15 attached to the side of lower base section 10′ protrudes through this slot, and nut 16 on said screw enables fixing base section 10′ at any desired angle with respect to base section 10″.

Both housing posts 25 are connected on top by crossplate member 26. Near the top and bottom of each housing post 25 are lateral holes 27 in which ride slide rods 28. The ends of slide rods 28 are provided with stops 29 to prevent complete forward withdrawal of the rods out of holes 27. The rearward ends of these slide rods are cut off in FIGURE 1 at 28′. Attached to the forward ends of these four slide rods is upper lateral support or arm 30, which connects the upper sliding rods. Also, lower lateral support or arm 31 connects the lower sliding rods. Both lateral arms or supports are held together by vertical struts 32 and 33. Roller 34 is pivoted between supports 30 and 31 at pivots 17 and 17′, while roller 35 is pivoted at 18 and 18′.

Lateral holes 36 in housing posts 25 allow sliding therein of the two upper slide rods 37 and the two lower slide rods 38 in a limiting manner, so as to prevent pulling out of these rods completely in a rearward direction. These rods terminate with flat bearing ends 37′ and 38′, respectively. Between each pair of ends 37′ and 38′, is connected a vertical strut 39. The two rollers 40 and 41 are pivoted at 42 and 43, respectively, in bearing ends 37′ and 38′. A coil spring 44 is disposed around each of slide rods 37 and 38, urging the rollers 40 and 41 in a rearwardly direction.

Attached to platform 24, in spaced relation approximately between housing posts 25, are vertical posts 45 and 46, which are connected on top with overlapping crossarm 22. Rollers 47 and 48 are pivoted between crossarm extensions and platform at pivots 19 and 20, respectively. Motor 13, mounted on platform 24, is provided with a conventional friction type drive to drive roller 47. A continuous or endless sheet 21 of platstic or similar material is mounted around rollers 34, 35, 41, 48, 47 and 40, in a manner so that it rotates in the direction shown, and presents a flat viewing surface between rollers 34 and 35.

The book 52 or other material to be read, is placed on rest 53 between housing plate 26 and rollers 34–35, rest 53 being attached to the lower portion of frame plate 26. Clamps 54 are provided on plate 26 to enable clamping the covers 52′ of book 52. A window 51 is disposed behind frame 50 and is designed to press on the open book to facilitate reading thereof. Since the open book surface may be uneven on both sides of the book, due to reading only the first few or the last few pages thereof, it is desirable to make window 51 of two pieces, one over each page side of the book. FIGURE 4 illustrates the details of the front portion of the machine. Attached to the rear of cross members 30 and 31 are rearwardly-projecting screws 49 which project through holes 55 in each corner of each window. A coil spring 56 urges window 51 rearwardly, so that in an uneven open book, one window will project rearwardly farther against the book pages than the other. An opaque sheet 57 of glass or plastic, or other suitable material, and covering only half of the open book, is provided. It may be mounted on or in the edges of frame 50 in laterally sliding relation, so as to cover the side (page) of the book that is not being read.

Rotating reading strip 21, as shown in FIGURE 5, has a horizontally stepped line demarcation 58, each step having the length of one line of the book and the depth of one line thereof. The upper portion 59 of strip 21 above the steps is made opaque, or colored a dark color, so as to prevent the reader from seeing printed material of the book that has already been read, while the portion 60 of the strip below the steps is transparent.

Filler posts 61 may be inserted on each side behind housing posts 25 in the event a very thin book or printed sheet of paper is read, and spring 44 is unable to extend the reading strip (by extending rollers 40 and 41) to the desired extent. A finger hole 62 is provided in opaque cover plate 57 to enable sliding the plate to the desired side. A start-stop switch 63 is connected to the motor 13, while a speed control, such as rheostat 64 is also mounted on base section 10' to set the desired speed for rotation of strip 21.

When in operation, the angle of the machine with respect to base 10 is set by means of screw 15, so that the reader has a clear view of the face of the machine. Thereafter, the desired book 52 is inserted by pulling forward arm 30 until sufficient space is present to insert the book between the arm and housing plate 26. After the book is stood on rest 53, the covers are clamped onto plate 26 by means of clamps 54.

It is assumed that frame 50 is off, and that strip 21 has been selected for the size and length of the lines in book 52, and has been mounted on the rollers by pushing forwardly roller 40 or 41, and then winding the strip over the rollers, as heretofore indicated. Springs 37 exert a thrust on strip 21 and thus keep it taut. This pressure presses rearwardly the rollers 34 and 35, as well as windows 51, which are then pressed against the pages to be read. Cover plate 57 is slid laterally to cover the page not to be read. Thereafter, the desired rotation speed is set on dial 64, and the reader is alerted to read when switch 63 is pressed.

Switch 63 begins rotating strip 21 (which had been previously set to begin covering the first line). As the reader continues to read, the strip moves along at a constant rate covering line after line. If the speed is too rapid for the reader, control 64 is adjusted, and the reader's speed is thus determined. Upon continued use of the machine and by gradually increasing the speed, an improvement in reading is effected.

It is understood that the machine of the present invention may be enclosed in a casing, a portion of which is shown in FIGURE 1, as 70.

I claim:
1. A directional attack reading machine, comprising, in combination,
   a base having a platform,
   a housing mounted on said base and having side supports, and a crossplate connected to said supports and against which a book may be placed for reading,
   a spring-loaded vertical roller extending rearwardly from each of said supports,
   a floating roller mounting extending forwardly from each of said supports,
   a vertical roller pivoted in each of said roller mountings,
   at least one stationary vertical roller mounted on said platform behind said crossplate,
   a motor mounted on said platform and designed to drive said stationary roller,
   at least one crosspiece connecting said pair of floating roller mountings,
   a viewing plate mounted on said crosspiece and designed to cover and press against at least a portion of a book placed on said crossplate,
   and endless strip mounted around said rollers in a manner such that it is rotated in reading direction across a page of a book placed on said crossplate,
      said strip having a stepped opaque and transparent area of step length and height adequate to cover sequentially each line of a page being read,
   switching means for said motor, and
   speed control means for said motor.

2. A directional attack reading machine, comprising, in combination,
   a base having a platform,
   a housing mounted on said base, and having side supports, and having a cross plate connected to said supports and against which a book may be placed for reading,
   a first laterally-directed upper hole in the upper portion of each support and a first laterally-directed lower hole in the lower portions thereof,
   slide rods designed to ride in each of said holes,
   a crossarm connecting the forward ends of the upper pair of said slide rods,
   a crossarm connecting the forward ends of the lower pair of said slide rods,
   a vertical support connecting both crossarms near each of their ends,
   a vertical roller mounted and pivoted between said upper and lower crossarms near each of the ends thereof,
   a second laterally-directed upper hole near the top of each of said supports, and a second laterally-directed lower hole near the bottom thereof,
   rearwardly-directed slide rods designed to ride in each of said second holes,
   a vertical strut connecting each pair of said latter upper and lower slide rods near their rearward ends,
   a vertical roller mounted and pivoted between each pair of said latter upper and lower slide rods near the ends thereof,
   a spring disposed around each of said latter slide rods between said supports and said rollers and designed to urge said rollers rearwardly,
   at least one vertical stationary strut attached to said base platform and extending vertically,
   a laterally-directed crossarm mounted on said strut,
   a roller mounted and pivoted between each end of said latter crossarm and said platform,
   a motor mounted on said platform and designed to drive one of said latter stationary rollers,
   and endless strip mounted around said rollers in a manner such that it is rotated in reading direction across a page of a book placed on said crossplate,
      said strip having a stepped opaque and transparent area of step length and height adequate to cover sequentially each line of a page being read,
   a viewing plate mounted on said forward crossarms and designed to cover and press against at least a page placed on said crossplate,
   switching means for said motor, and
   speed control means for said motor.

3. A directional attack reading machine according to claim 2 in which a frame is mounted on said forward crossarms and designed to frame the viewing portion of said strip.

4. A directional attack reading machine according to claim 3 in which an opaque cover plate is slidably mounted on said crossarm frame and designed to be slid laterally to cover a page which is not being read.

5. A directional attack reading machine according to claim 2 in which the base consists of a lower section and an upper section pivoted at the rear of the lower section and designed to be raised at an angle with respect to said lower section and locked in position.

6. A directional reading machine according to claim 2 in which said crossplate is provided with clamps for clamping a book cover onto said crossplate.

References Cited
UNITED STATES PATENTS

| | | | |
|---|---|---|---|
| 2,715,784 | 8/1955 | Genest | 35—35.2 X |
| 2,758,393 | 8/1956 | Levy | 35—35.2 |
| 3,090,137 | 5/1963 | Asrican | 35—35.2 |

EUGENE R. CAPOZIO, *Primary Examiner.*

W. GRIEB, *Assistant Examiner.*